United States Patent [19]

Choy et al.

[11] Patent Number: 5,279,755
[45] Date of Patent: Jan. 18, 1994

[54] THICKENING AQUEOUS ABRASIVE CLEANER WITH IMPROVED COLLOIDAL STABILITY

[75] Inventors: Clement K. Choy, Alamo; Brian P. Argo, Tracy, both of Calif.

[73] Assignee: The Clorox Company, Oakland, Calif.

[21] Appl. No.: 760,626

[22] Filed: Sep. 16, 1991

[51] Int. Cl.$^5$ .................... C09K 5/00; C11D 9/42
[52] U.S. Cl. ........................ 252/76; 252/94; 252/97; 252/99; 252/116; 252/128; 252/133; 252/135; 252/160; 252/174.25; 252/558; 252/DIG. 14; 134/42
[58] Field of Search ................ 252/76, 94, 97, 99, 252/116, 128, 133, 135, 160, 174.25, 539, 558, DIG. 14; 134/42

[56] References Cited

U.S. PATENT DOCUMENTS

| | | | |
|---|---|---|---|
| 3,956,158 | 5/1976 | Donaldson | 252/102 |
| 3,985,668 | 10/1976 | Hartman | 252/99 |
| 4,005,027 | 1/1977 | Hartman | 252/95 |
| 4,051,056 | 9/1977 | Hartman | 252/99 |
| 4,240,919 | 12/1980 | Chapman | 252/95 |
| 4,287,079 | 9/1981 | Robinson | 252/99 |
| 4,599,186 | 7/1986 | Choy et al. | 252/102 |
| 4,657,692 | 4/1987 | Choy et al. | 252/99 |
| 4,661,280 | 4/1987 | Ouhadi et al. | 252/99 |
| 4,695,394 | 9/1987 | Choy et al. | 252/97 |
| 4,752,409 | 6/1988 | Drapier et al. | 252/94 |
| 4,839,084 | 6/1989 | Ouhadi et al. | 252/174.21 |
| 4,842,757 | 6/1989 | Reboa et al. | 252/76 |
| 4,857,226 | 8/1989 | Drapier et al. | 252/174.25 |
| 4,950,416 | 8/1990 | Baxter | 252/99 |

FOREIGN PATENT DOCUMENTS

| | | | |
|---|---|---|---|
| 345611 | 12/1989 | European Pat. Off. | C11D 17/00 |
| 2176495 | 12/1986 | United Kingdom | C11D 17/00 |
| 2200921 | 8/1988 | United Kingdom | C11D 3/60 |

Primary Examiner—Anthony McFarlane
Assistant Examiner—Nhat D. Phan
Attorney, Agent, or Firm—Michael J. Mazza

[57] ABSTRACT

A thickened aqueous abrasive scouring cleanser containing bleach which is capable of stably suspending abrasives, has excellent bleach half-life stability, little or no syneresis and maintains these advantages over extended times and at elevated temperatures and comprises, in aqueous solution:
(a) a colloidal aluminum oxide thickener having average particle size of no greater than about one micron;
(b) at least one surfactant which can, in association with the aluminum oxide, provide proper rheology and cleaning;
(c) an electrolyte/buffer to promote the environment in which the aluminum oxide and surfactant can associate to provide proper rheology;
(d) a halogen bleach;
(e) a particulate abrasive having average particle size of about 40 to 800 microns to provide scouring action; and
(f) a phase stabilizing amount of a multivalent metal salt of a $C_{16-22}$ fatty acid.

21 Claims, 4 Drawing Sheets

THICKENING AQUEOUS ABRASIVE CLEANER WITH IMPROVED COLLOIDAL STABILITY

TECHNICAL FIELD

This invention relates to thickened aqueous scouring cleansers which contain abrasives and a bleach source and which have improved phase and viscosity stability.

BACKGROUND OF THE INVENTION

In the quest for hard surface cleaners which have efficacy against a variety of soils and stains, various heavy duty liquid cleansers have been developed. As an example, U.S. Pat. Nos. 3,985,668, 4,005,027 and 4,051,056 all issued to Hartman, show a combination of perlite (an expanded silica abrasive, which is here used as a filler), a colloid-forming clay, in combination with a hypochlorite bleach, a surfactant and a buffer in which abrasives are suspended. A clay thickened system of this type tends to set up or harden upon storage due to the false body nature of the thickeners, and requires shaking before use to break down the false body structure. Other prior art cleaners which attempt to suspend abrasives use either inorganic colloid thickeners only, or high levels of mixed surfactant thickeners. Syneresis often becomes a problem as the solids portion of such cleansers substantially separate from the liquids portion. One way to alleviate this is to use a perlite type material with specified particle size as defined in Hartman '668. Additionally, high levels of surfactants can be used to form a plastic rheology for suspension of abrasives. However, they also have a detrimental effect on hypochlorite stability. For the instant purpose, half-life stability is defined as the amount of time it takes for 50% of the initial amount of bleach present in a given composition to decompose.

U.S. Pat. No. 4,287,079, issued to Robinson, relates to a clay/silicon dioxide thickened, bleach-containing abrasive cleanser which could contain an anionic surfactant. Due to the clay-thickened rheology, cleansers of this sort quickly dry out and set up. While these type of cleansers thus become less flowable over time, they are unfortunately also plagued by significant syneresis problems. U.S. Pat. No. 3,956,158 to Donaldson shows an abrasive-containing bleach thickened with insoluble detergent filaments. Chapman, U.S. Pat. No. 4,240,919 describes a liquid abrasive scouring cleanser with a thixotropic rheology and discloses a multivalent stearate soap to provide the thixotropic rheology. The formulation of Chapman includes an aluminum oxide abrasive of a 400 micron particle size, which is not colloidal therefore cannot be used to suspend abrasive. Gel-like liquid automatic dishwasher detergents are disclosed in Drapier et al, U.S. Pat. No. 4,732,409; EP 345,611 to Delvaux et al (published Dec. 13, 1989); and Baxter, U.S. Pat. No. 4,950,416. Drapier et al and Delvaux et al disclose aluminum, magnesium, or zinc stearates to improve phase stability of liquid, gel-like, clay thickened dishwashing detergent, and to improve cup retention properties, i.e., to increase yield stress. The compositions of Drapier et al and Delvaux et al are clay thickened, phosphate-built thixotropic detergents, which differ significantly from the colloidal alumina thickened, plastic rheology of the compositions of the present invention. The phosphate builder system disclosed by these references is incompatible with a calcium carbonate abrasive. Baxter also discloses $C_{8-22}$ fatty acids or their aluminum, zinc or magnesium salts to increase yield stress and cup retention properties of an automatic dishwashing detergent which is thickened with a colloidal alumina. Like Drapier et al and Delvaux et al, however, the compositions of Baxter are phosphate based, and do not include an abrasive. While employing colloidal alumina as a thickener, Baxter uses only small amounts of surfactants for their cleaning funtionality, thus results in a thixotropic rheology, as compared with the plastic rheology of the formulations herein.

The disclosures of U.S. Pat. Nos. 4,599,186, 4,657,692 and 4,695,394, all to Choy et al, teach the use of an inorganic colloid combined with a surfactant/electrolyte system to provide good physical stability. These patents are commonly owned herewith and are incorporated herein by reference.

In view of the art, there remains a need for improving long term physical stability in liquid abrasive cleansers having colloidal alumina thickeners.

SUMMARY OF THE INVENTION

In one aspect of the invention, there is disclosed a thickened liquid abrasive cleanser with enhanced long-term phase and viscosity stability comprising, in aqueous solution:

(a) a colloidal aluminum oxide thickener having average particle size, in dispersion, of no greater than about one micron;

(b) at least one surfactant which can, in association with the aluminum oxide, provide proper rheology and cleaning;

(c) an electrolyte/buffer to promote the environment in which the colloidal aluminum oxide and surfactant can associate to provide proper rheology;

(d) a particulate abrasive;

(e) a phase or viscosity stabilizing amount of a multivalent metal salt of a $C_{16-22}$ fatty acid; and (f) the remainder, water and minor amounts of miscellaneous additives.

Optionally, a halogen bleach may be added to the foregoing embodiment of the cleanser of the present invention.

The hard surface abrasive scouring cleansers of the invention provide excellent viscosity stability while maintaining abrasive suspending. Additionally, the cleansers of the invention also show unexpectedly substantially no syneresis, even over time and at elevated temperatures, nor do they exhibit an increase in yield stress. Because of the resulting physical stability, the cleansers do not require shaking before use to resuspend solids into a flowable form.

A further embodiment of the invention provides an aqueous hard surface bleaching cleanser without substantial syneresis comprising, in aqueous solution:

(a) a colloidal alumina thickener having average particle size, in dispersion, of no greater than about one micron;

(b) a mixed surfactant system which comprises a cleaning-effective and abrasive-suspending amount of at least one anionic surfactant and one bleach-stable nonionic surfactant;

(c) an electrolyte/buffer to promote the environment in which the colloidal aluminum oxide and surfactants can associate to provide proper rheology;

(d) a halogen bleach;

(e) a fatty acid soap;

(f) a calcium carbonate abrasive having average particle size of about ten to eight hundred microns to provide proper scouring action;

(g) a phase or viscosity stabilizing amount of a multivalent metal salt of a $C_{16-22}$ fatty acid; and (h) the remainder, water and minor amounts of miscellaneous additives.

A still further embodiment of the invention provides a method making the thickened liquid bleaching cleanser with improved physical stability. In said method, it is important to solubilize the multivalent metal salt of a $C_{16-22}$ fatty acid by mixing with at least one surfactant and slight heating. It is also important to add the fatty acid salt/surfactant mixture to the remaining ingredients as the penultimate step, and just prior to addition of addition of the electrolyte buffer.

It is therefore an object of this invention to provide a stable aqueous hard surface abrasive bleaching cleanser which has the ability to stably suspend abrasive particles.

It is a further object of this invention to provide a hard surface abrasive bleaching cleanser which has substantially no syneresis, and which is stable over time and at elevated temperatures.

It is a still further object of this invention to provide a hard surface abrasive scouring cleanser which has an excellent shelf stability in terms of bleach half-life.

It is a further object of the present invention to provide a hard surface abrasive, bleaching cleanser which does not increase in viscosity over time, while retaining its desired low yield stress to ensure ease of dispensing.

It is yet another object of this invention to provide an aqueous hard surface abrasive cleanser which does not require shaking before use to facilitate pouring/dispensing.

It is still another object of this invention to provide an aqueous hard surface abrasive cleanser which does not set up or harden over time and therefore remains easily flowable.

It is a further object of this invention to provide an aqueous scouring abrasive cleanser which has demonstrated cleaning efficacy on soap scums, oily soils, and oxidizable stains, e.g., organic stains.

It is a further object of the present invention to provide a hard surface bleaching cleanser which exhibits good freeze/thaw stability.

DETAILED DESCRIPTION OF THE INVENTION

Figure 1:
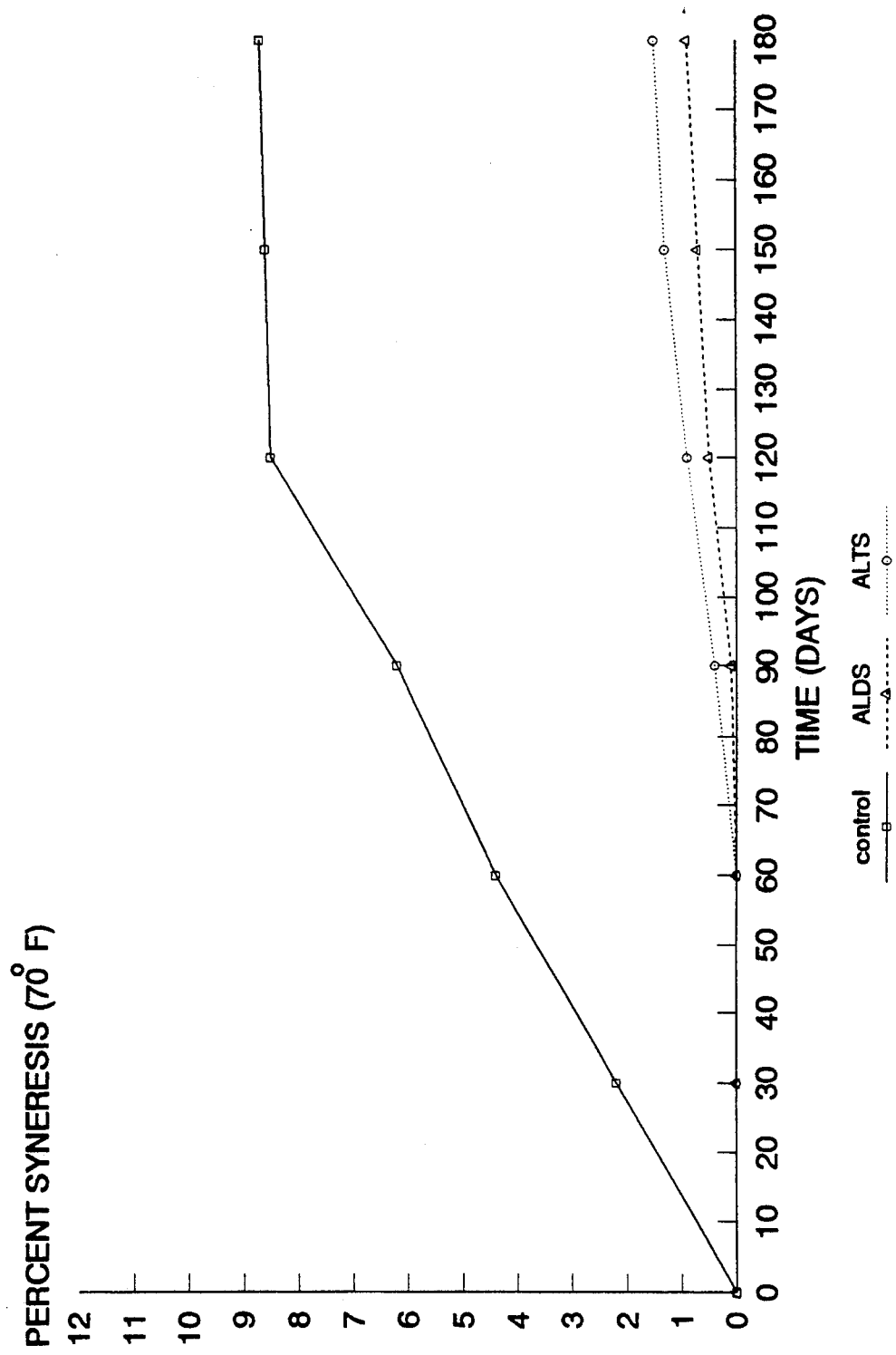
FIG. 1 is a graph showing phase stability of two formulations of the present invention at 70° F.

The invention provides a hard surface abrasive scouring cleanser having no significant syneresis, undue viscosity or yield stress increase, stably suspends abrasives, and has excellent bleach half-life. All of the foregoing advantages are present over time and after these compositions have been subjected to storage at elevated temperatures.

Furthermore, as compared to prior art cleaners which include high levels of mixed surfactants, the present invention provides a stably suspended abrasive scouring cleanser which uses relatively small amounts of surfactants, thus lowering the total cost of producing these cleansers.

In one embodiment, the invention provides a hard surface abrasive scouring cleanser comprising, in aqueous solution:

(a) a colloidal aluminum oxide thickener having average particle size of no greater than about one micron;

(b) at least one surfactant which can, in association with the colloidal aluminum oxide, provide proper rheology and cleaning;

(c) an electrolyte/buffer to promote the environment in which the aluminum oxide and surfactant can associate to provide proper rheology;

(d) a particulate abrasive;

(e) a phase or viscosity stabilizing amount of a multivalent metal salt of a $C_{16-22}$ fatty acid; and (f) the remainder, water and minor amounts of miscellaneous additives.

Optionally, a halogen bleach may be added to the foregoing embodiment of the cleanser of the present invention.

Applicants surprisingly discovered that the use of a multivalent metal salt of a $C_{16-22}$ fatty acid would substantially overcome the problem of phase separation while preventing an undesired increase in viscosity, and without increasing yield stress. While such salts are used in various liquid cleansers (See, e.g., Chapman et al, U.S. Pat. No. 4,240,919 to aid in developing a thixotropic rheology), nothing in the prior art has disclosed, taught or suggested that a multivalent metal salt of a $C_{16-22}$ fatty acid can be used to improve phase or viscosity stability without increasing yield stress in an aqueous cleanser employing a colloidal alumina thickener and a calcium carbonate abrasive.

A further embodiment of the invention provides an aqueous hard surface bleaching cleanser without substantial syneresis comprising, in aqueous solution:

(a) a colloidal alumina thickener having average particle size, in dispersion, of no greater than about one micron;

(b) a mixed surfactant system which comprises a cleaning-effective and abrasive-suspending amount of at least one anionic surfactant and one bleach-stable nonionic surfactant;

(c) an electrolyte/buffer to promote the environment in which the colloidal aluminum oxide and surfactants can associate to provide proper rheology can associate to provide proper rheology;

(d) a halogen bleach;

(e) a fatty acid soap;

(f) a calcium carbonate abrasive having average particle size of about ten to eight hundred microns to provide proper scouring action;

(g) a phase stabilizing amount of a multivalent metal salt of a $C_{16-22}$ fatty acid; and (h) the remainder, water and minor amounts of miscellaneous additives.

The individual constituents of the inventive cleansers are described more particularly below. Additionally, the term "effective amount" means an amount sufficient to accomplish the intended purpose, e.g., thickening, suspending, cleaning, etc.

ALUMINA

The colloidal thickening component of this invention is provided by an alumina, or hydrated aluminum oxide. A typical alumina is Dispural ®, distributed by Remet Chemical Corp., Chadwicks, N.Y., and manufactured by Condea Chemie, Brunsbuettel, West Germany. Dispural ® is an aluminum oxide monohydrate which forms stable colloidal aqueous dispersions.

These particular types of aluminas are dry powders which can form thixotropic gels, bind silica and other ceramic substrates, possess a positive charge when dissolved in acidic media, and are substantive to a variety of surfaces. Dispural ® has a typical chemical composition of 90% alpha aluminum oxide monohydrate (boehmite) 9% water, 0.5% carbon (as primary alcohol), 0.008% silicon dioxide, 0.005% ferric oxide, 0.004% sodium silicate, 0.05% sulfur. It has a surface area (BET) of about 320 m$^2$/gm, average particle size (as determined by sieving) of 15% greater than 45 microns and 85% less than 45 microns, an X-ray diffraction dispersion of 0.0048 micron, and bulk density of 45 lbs./ft.$^3$ loose bulk and 50 lbs./ft.$^3$ packed bulk.

Another commercial source of alumina suitable for use is Catapal ® Alumina, manufactured by the Vista Chemical Company. Catapal ® SB has a typical chemical composition of 74.2% aluminum oxide (boehmite), 25.8% water, 0.36% carbon, 0.008% silicon dioxide, 0.005% ferric oxide, 0.004% sodium oxide, and less than 0.01% sulfur. It has a surface area (BET) of 280 m$^2$/gm, average particle size (as determined by sieving) of 38% (less than 45 microns) and 19% (greater than 90 microns). Capatal ® D has a chemical composition of about 73% alumina, 0.15% carbon, 0.01% silicon dioxide, 0.01% ferric oxide, 0.03% titanium dioxide and 26.8% water. It has a BET surface area of about 220M$^2$/gm and an average particle size distribution of 35% less than 45 microns, and 17% greater than 90 microns.

These colloidal alumina thickeners generally have exceedingly small average particle size (i.e., generally 90% are less than 50 microns in average particle size). They have an average particle size diameter of less than 40, more preferably less than 30, and most preferably less than 25 microns. The average measured particle size diameter of these thickeners, as supplied, is likely to be around 1-10 microns. In dispersion, however, the average particle size of these aluminas is less than about one micron. Little or substantially no abrasive action is provide by these types of thickeners even though they are chemically insoluble, inorganic particles due to their small particle size. Additionally, boehmite, which is the mineral from which these colloidal aluminas are manufactured, has a Mohs hardness of about 3, thus any abrasive action provided by these aluminum oxides is substantially mitigated due to their relative softness.

Boehmite, the mineral from which these preferred hydrated aluminas are derived, is typically found in bauxite ore deposits. An important aspect of the hydrated aluminas used herein is that they must be chemically insoluble, i.e., must not dissolve in acidic, basic or neutral media in order to have effective thickening as well as stability properties. Neutralization of the acidified colloid is necessary to obtain the desired product rheology. Thus, the acidified, diluted colloid is neutralized, preferably by sodium hydroxide (e.g., a 50% solution), although if the electrolyte/buffer is sodium carbonate or sodium silicate, it may be possible to forgo the sodium hydroxide as a separate component. Secondly, since a halogen bleach is desired to be added to the cleansers of this invention, and such bleaches are unstable in the presence of acid, neutralization is also desirable. While the alkaline neutralizing agent can be added separately, it is possible to use an anionic surfactant as a carrier therefor.

With respect to thickening, it should be noted that while there are many types of inorganic and organic thickeners, not all will provide the proper type of plastic, flowable rheology desired in the invention. Common clays, for instance, will likely lead to a false body rheology, which, at rest, turn very viscous. A thixotropic rheology is also not desirable in this invention since in the thixotropic state, a liquid at rest also thickens dramatically. If the thixotrope has a yield stress value, as typically found in clay-thickened liquid media, the fluid at rest may not re-achieve flowability without shaking or agitation. Even if colloidal alumina alone is used to thicken the liquid cleansers of this invention, a thixotrope with high yield stress values appears to result. The surfactants included in the formulas of this invention are important in achieving the creamy, plastic rheology. This sort of rheology does not require shearing to promote fluidity. Thus, a product made in accordance with this invention will not generally require squeezing, shaking or agitation to flow out of the container or dispenser.

SURFACTANTS

As mentioned herein above, the surfactants suitable for use in this invention are selected from anionic, bleach-stable nonionic, amphoteric, zwitterionic surfactants and mixtures thereof. It is especially preferred to use a combination of anionics and bleach-stable nonionics.

The anionic surfactants are selected from bleach-stable surfactants such as alkali metal alkyl sulfates, secondary alkane sulfonates (also referred to as paraffin sulfonates), alkyl diphenyl ether disulfonates, fatty acid soaps, and mixtures thereof. These anionic surfactants will preferably have alkyl groups averaging about 8 to 20 carbon atoms. In practice, any other anionic surfactants which do not degrade chemically when in contact with a hypohalite, e.g., hypochlorite, bleaching species should also work. An example of a particularly preferred secondary alkane sulfonate is HOSTAPUR SAS, manufactured by Farbwerke Hoechst A. G., Frankfurt, West Germany. An example of typical alkali metal salts of alkyl benzene sulfonic acids are those manufactured by Pilot Chemical Company sold under the trademark Calsoft ®. An example of a typical alkali metal alkyl sulfate is Conco Sulfate WR, sold by Continental Chemical Company which has an alkyl group of about 16 carbon atoms. When the electrolyte used is an alkali metal silicate, it is most preferable to include a soluble alkali metal soap of a fatty acid, such as a $C_{6-14}$ fatty acid soap. Especially preferred are sodium and potassium soaps of lauric and myristic acid.

Examples of preferred bleach-stable nonionic surfactants are amine oxides, especially trialkylkyl amine oxides, as representative below.

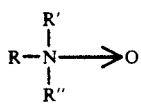

In the structure above, R' and R" can be alkyl of 1 to 3 carbon atoms, and are most preferably methyl, and R is alkyl of about 10 to 20 carbon atoms. When R' and R" are both methyl and R is alkyl averaging about 12 carbon atoms, the structure for dimethyldodecylamine oxide, a particularly preferred amine oxide, is obtained. Representative examples of these particular type of bleach-stable nonionic surfactants include the dimethyldodecylamine oxides sold under the trademark Ammonyx® LO by Stepan Chemical. Yet other preferred amine oxides are those sold under the trademark Barlox®, by Lonza, Conco XA sold by Continental Chemical Company, Aromax sold by Akzo, and Schercamox, sold by Scher Brothers, Inc. These amine oxides preferably have main alkyl chain groups averaging about 10 to 20 carbon atoms. Other types of suitable surfactants include amphoteric surfactants, exemplary of which are betaines, imidazolines and certain quaternary phosphonium and tertiary sulfonium compounds.

As mentioned previously, it is particularly preferred to combine at least two of these surfactants, most preferably the anionics and the bleach stable nonionics. Combinations of these types of surfactants appear to be particularly favorable to maintaining hypochlorite half-life stability at elevated temperatures for long periods of time.

Determining an appropriate mixture of alumina and surfactants is very important to the invention. While theoretically anywhere from about 1% to 25% alumina can be used, and about 0.1 to 15% surfactants (anionic, bleach stable nonionic or mixtures thereof), so long as proper rheology (plastic, flowable), desirable bleach stability and lack of phase separation or syneresis result, in practice it is preferred to use minimal quantities of alumina and surfactants. The amount that is ordinarily used is an amount which is both abrasive-suspending and cleaning-effective amount. Applicants have found that preferably about 1% to 10%, and most preferably about 2% to 8% alumina, and preferably about 0.25% to 5.0%, most preferably about 0.5% to 3.0% of total surfactant are used in the cleansers of this invention. These ranges appear to result in compositions having the desired syneresis values, ability to suspend abrasives, optimal bleach half-lives, and, because of the reduced amount of actives in the compositions, lower overall manufacturing costs. As mentioned, using a mixed surfactant system alone, in high amounts to provide proper rheology for suspension of abrasives, results in reduced bleach half-life. Alumina, by itself, on the other hand, provides a composition with unacceptable syneresis.

MULTIVALENT FATTY ACID METAL SALT

It has been surprisingly discovered that small amounts of a multivalent metal salt of a $C_{16-22}$ fatty acid acts as a phase and viscosity stabilizer to greatly improve phase and viscosity stability of the inventive cleanser. Chapman et al '919, noted that a relatively high ratio of multivalent distearate soap to filler would develop a thixotropic rheology in a non-bleach containing formulation. However, Chapman et al '919 does not teach, disclose or suggest that fatty acid metal salts can be used to improve phase or viscosity stability in a liquid system thickened with surfactants, electrolytes and colloidal alumina. The previously mentioned Drapier et al and Delvaux et al references also disclose aluminum stearates, but not for use in a colloidal alumina/electrolyte/surfactant thickened system, and also not to provide viscosity stability, i.e., to prevent viscosity increase during shelf life and consumer storage.

Without intending to be bound by theory, it is suggested that the fatty acid metal salts disclosed herein bind to oxygens in the colloidal alumina, which in turn protects the alumina from being tightly bound by the electrolyte, especially silicates, which would cause a viscosity increase. The preferred $C_{16-22}$ fatty acid chain length also serves to coat the alumina to a greater extent than the shorter chain fatty acids, especially soaps, thus greater phase stability results. Preferred fatty acids are stearic and palmitic, while preferred metal salts include aluminum and magnesium. More preferred are aluminum stearates, either mono-, di- or tri-stearates, while most preferred is aluminum distearate. It is preferred that about 0.05-2%, more preferably 0.1-1%, and most preferably, about 0.25-0.75% by weight of the multivalent metal salt of a $C_{16-22}$ fatty acid be added as a phase or viscosity stabilizer.

ELECTROLYTES/BUFFERS

The electrolyte/buffers appear to promote the favorable environment in which the surfactants and the alumina can combine. Electrolytes function, on the one hand, to provide sources of ion (generally anions) in aqueous solution. This provides a charged medium in which the alumina thickener and surfactants can interact, providing the favorable plastic rheology of the invention. Buffers, on the other hand, may act to maintain pH, and in this instance, alkaline pH is favored for purposes of both rheology and maintaining hypochlorite stability. Some compounds will serve as both buffer and electrolyte. These particular buffers/electrolytes are generally the alkali metal salts of various inorganic acids, to which the alkali metal salts of phosphates, polyphosphates, pyrophosphates, triphosphates, tetraphosphates, silicates, metasilicates, polysilicates, carbonates, hydroxides, and mixtures of the same. Certain divalent salts, e.g., alkaline earth salts of phosphates, carbonates, hydroxides, etc., can function singly as buffers. If such compounds were used, they would be combined with at least one of the previous electrolytes/buffers mentioned to provide the appropriate pH adjustment. It may also be suitable to use as buffers such materials as aluminosilicates (zeolites), borates, aluminates and bleach-stable organic materials, such as gluconates, succinates, maleates, sodium chloride or sodium sulfate could be utilized as electrolytes, but not buffers, if necessary, to maintain the ionic strength necessary for the desired rheology. An especially preferred electrolyte/buffer is an alkali metal silicate, which, as previously mentioned herein, is employed in combination with an alkali metal fatty acid soap to provide the particular, plastic rheology desired in this invention. The preferred silicate is sodium silicate, which has the empirical formula $NaO:SiO_2$. The ratio of sodium oxide:silicon dioxide is about 1:4 to 1:1, more preferably about 1:2. Silicates are available from numerous sources, such as PQ Corporation. These electrolyte/buffers function to keep the pH ranges of the inventive cleansers preferably above 7.0, more preferably at between about 10.0 to 14.0. The amount of electrolyte/buffer can vary from about 0.5% to 25.0%, preferably 1.0 to 5%.

HALOGEN BLEACH

A source of bleach is selected from various halogen bleaches. For the purposes of this particular invention, halogen bleaches are particularly favored. As examples thereof, the bleach may be preferably selected from the group consisting essentially of the alkali metal and alkaline earth salts of hypohalite, hypohalite addition products, haloamines, haloimines, haloimides and haloamides. These also produce hypohalous bleaching species in situ. Preferred is hypochlorite and compounds producing hypochlorite in aqueous solution, although hypobromite is another potential halogen bleach. Representative hypochlorite producing compounds include sodium, potassium, lithium and calcium hypochlorite, chlorinated trisodium phosphate dodecahydrate (hypohalite addition product), potassium and sodium dichloroisocyanurate, trichlorocyanuric acid, dichlorodimethyl hydantoin, chlorobromo dimethylhydantoin, N-chlorosulfamide (haloamide), and chloramine (haloamine). Particularly preferred in this invention is sodium hypochlorite having the chemical formula NaOCl, in an amount ranging from about 0.1% to about 15%, more preferably about 0.25% to 5%, most preferably about 0.5% to 2.0%. The purpose for the bleach is evident. This particular sort of oxidizing cleaning agent is very effective against oxidizable stains, e.g., organic stains. The principle problem with bleach is also apparent; in combination with most actives in an aqueous system, oxidation occurs, and the bleach's efficacy can be greatly reduced. As mentioned, it is particularly surprising that in the composition of this invention, bleach stability as expressed in half-lives is so excellent, which, in a commercial setting, is a necessary requirement to market a shelf-stable product that maintains its efficacy throughout its shelf-life. Excessive decomposition of hypochlorite is also detrimental since oxygen gas evolves and can cause pressure to build up in the package, resulting in a foamy product.

ABRASIVES

Abrasives are used in the invention to promote cleaning action by providing a scouring action when the cleansers of the invention are used on hard surfaces. Preferred abrasives include calcium carbonate but harder abrasives such as a perlite, silica sand and various other insoluble, inorganic particulate abrasives can be used, such as quartz, pumice, feldspar, tripoli and calcium phosphate. Abrasives can be present in amounts ranging from about 1 to 55% by weight of the compositions of this invention. Particle size will range from average particle size of about ten to eight hundred, more preferably forty to six hundred, most preferably fifty to five hundred microns. In general, about 50% or more of the particles will have particle diameters of greater than one hundred microns (pass through U.S. 150 mesh sieves). Particle hardness of the abrasives can range from Mohs hardness of about 2-8, more preferably 3-6. Abrasives are generally insoluble inorganic materials (although there are some organic abrasives, to wit, corn cobs, rice hulls, melamine granules, urea formaldehyde, etc.). Especially preferred is calcium carbonate, also known as calcite. Calcite is available from numerous commercial sources such as Georgia Marble Company, and has a Mohs hardness of about 3. Typically, a size of U.S. 140 mesh is selected, although others may be appropriate. Some thickeners are also insoluble inorganic materials, for instance, the aluminum oxide thickeners of this invention. However, because of the relatively small surface area of the abrasives, compared to the thickeners, which are of much smaller average particle diameter, little or no thickening occurs with the abrasives. Further, without the aluminum oxide thickeners of this invention, these abrasives cannot be stably suspended.

Further desirable adjuncts include bleach stable dyes (e.g., anthraquinone dyes), pigments (e.g., ultramarine blue), colorants and fragrances in relatively low amounts, e.g., about 0.001% to 5.0%, each, by weight of the composition.

METHOD OF PREPARING

In the process of preparing the compositions of the present invention, alumina is first activated by mixing with an acid, and to this NaOH is added. Next added are an active halogen source, abrasive, and a warm surfactant/fatty acid salt mixture. Any adjuncts, including fragrances are then added, and the final step is the addition of sodium silicate, with mixing in an amount sufficient to yield a uniform, slightly opaque composition. In the method of making the thickened liquid abrasive cleanser with improved physical stability, is preferred to add the surfactant mixture continuing the phase stabilizing amount of the multivalent fatty acid salt as the penultimate step, just prior to adding the silicate buffer.

EXPERIMENTAL FORMULATION EXAMPLE

EXAMPLE 1

| Ingredient | Weight % |
| --- | --- |
| Alumina[1] | 2.5% |
| Secondary Alkane Sulfonate[2] | 1.8% |
| Amine Oxide[3] | 0.9% |
| Buffer/electrolyte | 0.8% |
| Fatty acid metal salt | 0.5% |
| NaOCl | 1.1% |
| Fragrance | 0.04% |
| Calcium Carbonate Abrasive | 30% |
| Water + Minors | Balance |

[1] $Al_2O_3 \cdot H_2O$, manufactured by Vista Chemical.
[2] Secondary alkane sulfonate surfactant, manufactured by Farbwerke Hoechst A.G., Frankfurt, West Germany.
[3] Ammonyx LO from Stepan.

Tables IA and IB below show viscosity, and phase stability, respectively, at 70° F., 100° F. and 120° F. for three different formulations, of Example 1 of the present invention, and Tables IC and ID show freeze-thaw stability for the same three formulations.

Figure 2:
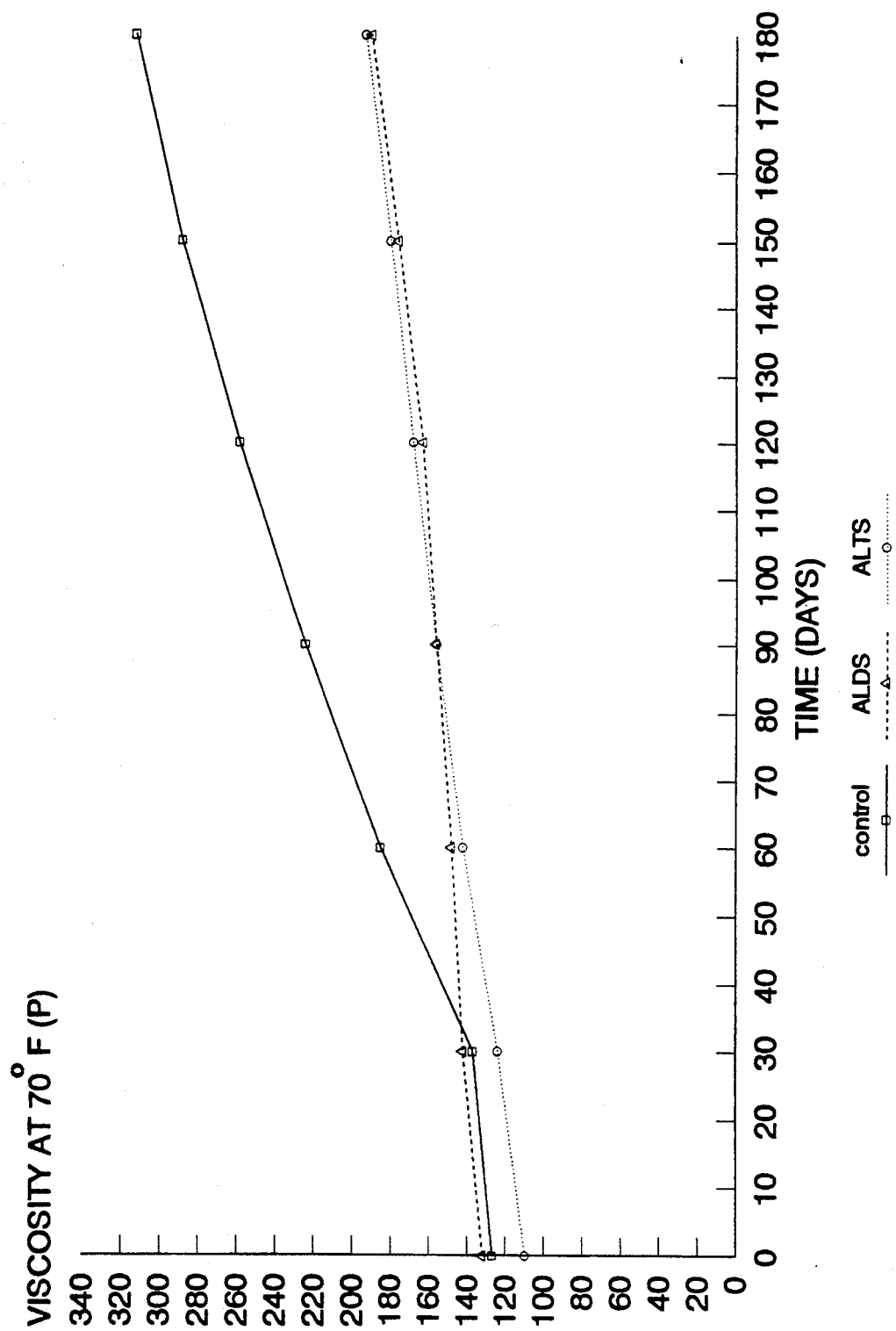
FIG. 2 is a graph showing viscosity stability, with viscosity measured in poise (P), of two formulations of the present invention at 70° F.
Figure 3:
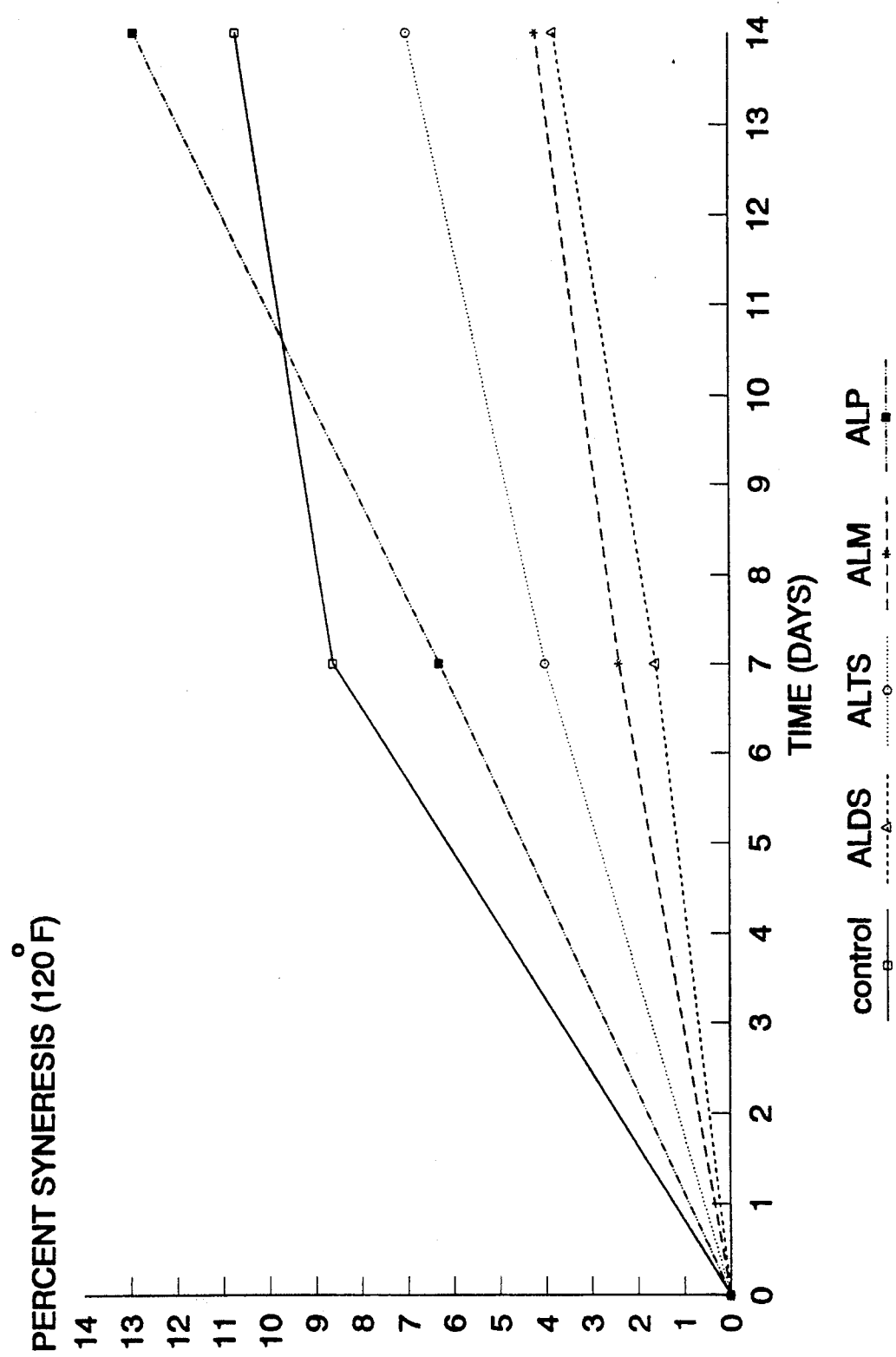
FIG. 3 is a graph showing phase stability of four formulations of the present invention at 120° F.
Figure 4:
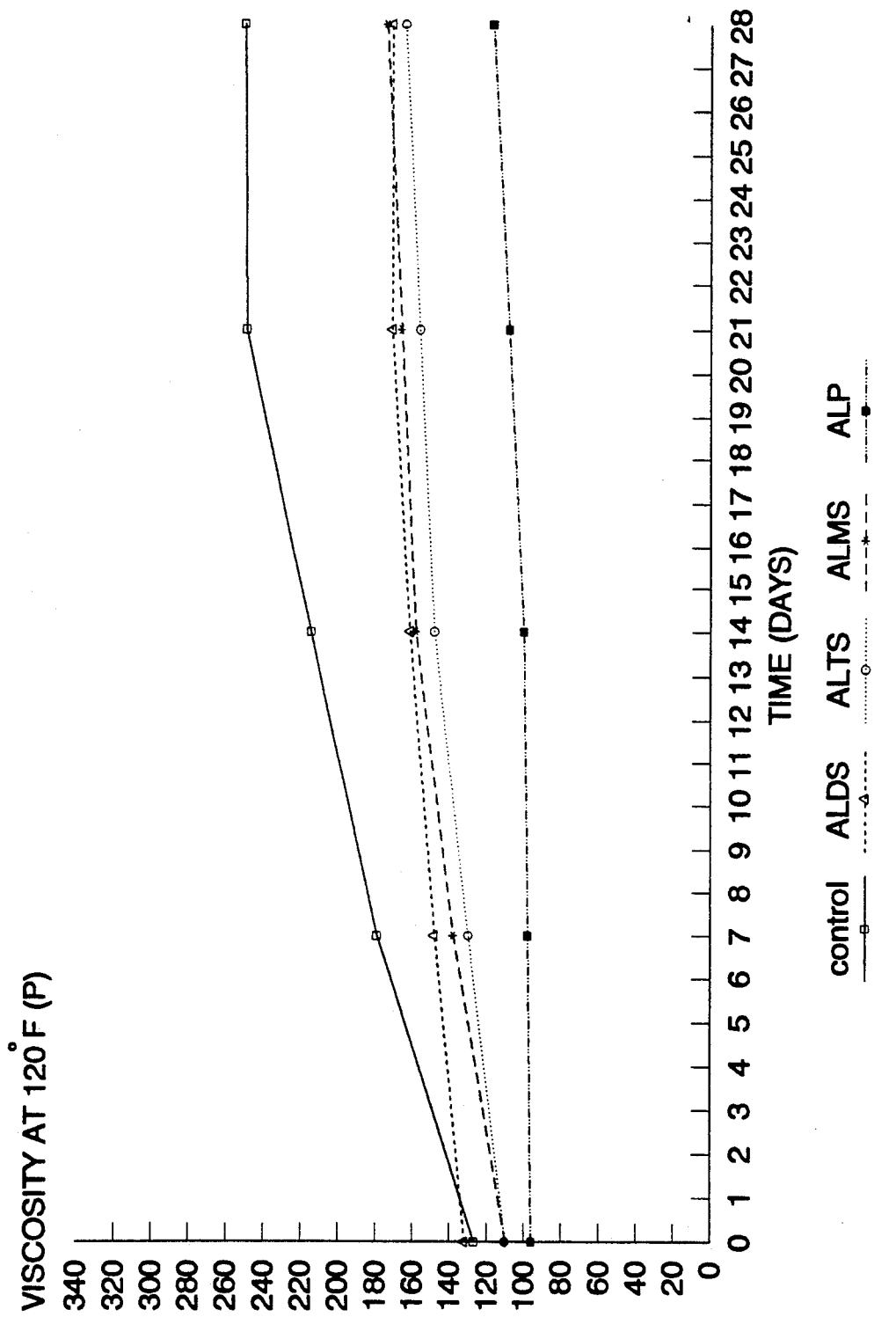
FIG. 4 is a graph showing viscosity stability with viscosity measured in poise (P), of four formulations of the present invention at 120° F.

Phase and viscosity stability data for formulations of Example 1 is additionally presented in graphical form in FIGS. 1-4. In each case, the control is a commercially available liquid abrasive cleanser. The fatty acid metal salt was added at the 0.5% level, and comprises aluminum distearate (ALDS); aluminum tristearate (ALTS); aluminum monostearate (ALMS); and aluminum palmitate (ALP).

In each case, viscosities were measured with a Brookfield Model DV2-RV viscometer at 5 rpm. Syneresis was measured by visual observation of the syneresis layer in natural polypropylene bottles. Relative heights of the syneresis layer was measured using a ruler and compared to the total fluid height. Freeze thaw phase and viscosity stability was obtained by storing samples of the composition at 0° F. for sixteen hours, then at 70°

F. for seven hours, and viscosity and syneresis were measured as above.

TABLE IA
VISCOSITY STABILITY

| Temperature (°F.) | Time (days) | % Viscosity Increase | | | |
|---|---|---|---|---|---|
| | | Control | ALTS | ALDS | ALMS |
| 70 | 180 | 146 | 75 | 44 | NA |
| 100 | 40 | 111 | 50 | 28 | 33 |
| 120 | 14 | 69 | 27 | 22 | 45 |

Initial viscosities (Poise): Control = 127; ALTS = 110; ALDS = 132; ALMS = 110
ALTS = 0.5% aluminum tristearate
ALDS = 0.5% aluminum distearate
ALMS = 0.5% aluminum monostearate
Control = commercially-available liquid abrasive cleanser

TABLE IB
PHASE STABILITY

| Temperature (°F.) | Time (days) | % Syneresis | | | |
|---|---|---|---|---|---|
| | | Control | ALTS | ALDS | ALMS |
| 70 | 180 | 9 | 1 | 1 | NA |
| 100 | 40 | 9 | 3 | 3 | NA |
| 120 | 14 | 11 | 4 | 4 | 4 |

TABLE IC
FREEZE/THAW VISCOSITY STABILITY

| % Viscosity Decrease | | | |
|---|---|---|---|
| Control | ALTS | ALDS | ALMS |
| 60 | 0 | 10 | 6 |

TABLE ID
FREEZE/THAW PHASE STABILITY

| % Phase Separation | | | |
|---|---|---|---|
| Control | ALTS | ALDS | ALMS |
| 33 | 10 | 4.3 | 14 |

Initial viscosities (Poise): Control = 127; ALTS = 110; ALDS = 132; ALMS = 110
ALTS = 0.5% aluminum tristearate
ALDS = 0.5% aluminium distearate
ALMS = 0.5% aluminum monostearate
Control = commercially-available liquid abrasive cleanser Table IIA below shows the effect of varying the metal ion of the fatty acid salt. Syneresis and percentage viscosity increase are shown after 14 days at 120° F.

TABLE IIA
EFFECT OF VARYING METAL ION

| Metal Ion | % Syneresis | % Viscosity Increase |
|---|---|---|
| Al | 4 | 22 |
| Zn | 7 | 50 |
| Mg | 5 | 59 |
| Control | 11 | 69 |

Table IIB is a comparison of the effect of metal ion on freeze-thaw stability, reported as percentage change in viscosity and percent syneresis. A negative value for viscosity change denotes a decrease in viscosity.

TABLE IIB
FREEZE/THAW STABILITY

| | % Syneresis | % Viscosity Change |
|---|---|---|
| Al | 10 | −6 |
| Zn | 60 | 134 |
| Mg | 84 | 28 |
| Control | 33 | −66 |

Initial Viscosities (P): Control = 127; Aluminum Distearate = 132; Zinc Stearate = 105; Magnesium Stearate = 106

Recovery time, i.e. the time to rethicken to rest viscosity after shearing, was determined for compositions of the present invention containing a multivalent metal salt of a $C_{16-22}$ fatty acid versus a control with no phase modifier. Recovery time was determined by creep testing on a Bohlin CS rheometer following a shear of greater than about five times the yield stress. A yield stress value was obtained using the Bohlin CS rheometer and recovery time measured. The control required about twelve minutes to recover, compared to about three hours for the compositions of the present invention.

The yield stress value, which is the amount of stress applied to the system necessary to induce flow, was not observed to change to a significant degree upon addition of the phase or viscosity stabilizing amount of the fatty acid metal salt. This is an important advantage in that rheological stability is obtained without increasing the yield stress, which could inhibit or prevent pouring or dispensing of the formulation.

Cleaning performance results show that the enhanced phase and viscosity stability afforded by the formulation of the present invention does not degrade cleaning performance compared to a control having no multivalent fatty acid salt.

Review of the above experimental data shows that the compositions of the invention have excellent phase and viscosity stability while retaining hypochlorite stability, and maintain these advantageous features over extended times and at elevated temperatures. Concurrently with these rheological advantages the performance of the formulation of the present invention is at least as good as any of the leading commercial products, over a wide range of soils.

The above examples have been depicted solely for purposes of exemplification and are not intended to restrict the scope or embodiments of the invention. The invention is further illustrated with reference to the claims which follow hereto.

What is claimed is:

1. A hard surface abrasive scouring cleanser having improved phase and viscosity stability comprising, in aqueous solution,
    (a) a colloidal aluminum oxide thickener having average particle size, in dispersion, of no greater than about one micron;
    (b) at least one surfactant which will associate with the aluminum oxide to provide a plastic flowable rheology;
    (c) an electrolyte/buffer to promote the environment in which the aluminum oxide and surfactant associate to provide said plastic flowable rheology;
    (d) a particulate abrasive; and
    (e) a phase or viscosity stabilizing amount of a multivalent metal salt of a $C_{16-22}$ fatty acid wherein the metal is aluminum, magnesium or zinc.

2. The cleanser of claim 1 wherein
    the electrolyte/buffer is selected from the group consisting of phosphates, polyphosphates, pyrophosphates, triphosphates, tetraphosphates, silicates, metasilicates, polysilicates, carbonates, hydroxides; alkali metal salts thereof; and mixtures thereof.

3. The cleanser of claim 1 wherein
the multivalent metal salt of a $C_{16-22}$ fatty acid is magnesium or zinc distearate; aluminum mono-, di- or tri- stearate; aluminum palmitate; or mixtures thereof.

4. The cleanser of claim 1 and further including
a halogen bleach selected from the group consisting of the alkali metal and alkaline earth salts of hypohalite, and hypohalite addition products.

5. The cleanser of claim 1 wherein
the particulate abrasive is calcium carbonate.

6. The cleanser of claim 1 wherein
the surfactant is selected from the group consisting of anionic, nonionic, amphoteric, zwitterionic surfactants, and mixtures thereof.

7. The cleanser of claim 6 wherein
the surfactant is an anionic surfactant selected from the group consisting of alkali metal alkyl sulfates, secondary alkane sulfonates, alkyldiphenyl ether disulfonates, and mixtures thereof.

8. The cleanser of claim 6 wherein
the surfactant is an amine oxide.

9. The cleaner of claim 6 wherein
the surfactant comprises a mixture of anionic and bleach-stable nonionic surfactants.

10. The cleanser of claim 9 wherein
the anionic surfactant is a secondary alkane sulfonate and the bleach-stable nonionic surfactant is an amine oxide.

11. The cleanser of claim 1 and further including a $C_{6-14}$ soap.

12. The cleanser of claim 1 wherein
the aluminum oxide thickener is present in an amount of about 1% to 25%, the multivalent fatty acid metal salt is present in an amount of about 0.05-2%, the electrolyte/buffer is present in an amount of about 0.5% to 25%, the surfactant is present in an amount of about 0.1% to 15%, the halogen bleach is present in an amount of about 0.1 to 15%, and the abrasive is present in an amount of about 1 to 55%, all based on the weight of the cleanser.

13. An aqueous hard surface abrasive cleanser, without substantial syneresis, comprising
(a) a colloidal alumina thickener having average particle size, in dispersion, of no greater than about one micron;
(b) a mixed surfactant system which comprises a cleaning-effective and abrasive-suspending amount of at least one anionic surfactant and one bleach-stable nonionic surfactant;
(c) an electrolyte/buffer to promote the environment in which the colloidal alumina and surfactant associate to provide a plastic flowable rheology;
(d) a halogen bleach;
(e) a fatty acid soap;
(f) a particulate abrasive having an average particle size of about 40 to 800 microns; and
(g) a phase or viscosity stabilizing amount of a multivalent metal salt of a $C_{16-22}$ fatty acid wherein the metal is aluminum, magnesium or zinc.

14. The cleanser of claim 13 wherein
the anionic surfactant is selected from the group consisting of alkali metal alkyl sulfates, secondary alkane sulfonates, alkyl diphenyl ether disulfonates, and mixtures thereof; and the bleach-stable nonionic surfactant is an amine oxide.

15. The cleanser of claim 13 wherein
the buffer/electrolyte is selected from the group consisting of phosphates, polyphosphates, pyrophosphates, triphophates, tetraphosphates, silicates, metasilicates, polysilicates, carbonates, hydroxides; the alkali metal salts thereof; and mixtures thereof.

16. The cleanser of claim 13 wherein
the halogen bleach is selected from the group consisting of the alkali metal and alkaline earth salts of hypohalite and hypohalite addition products.

17. The cleanser of claim 13 wherein
the abrasive is calcium carbonate.

18. The cleanser of claim 13 wherein
the aluminum oxide thickener is present in an amount of about 1% to 25%, the multivalent fatty acid metal salt is present in an amount of about 0.05-2%, the electrolyte/buffer is present in an amount of about 0.5% to 25%, the surfactant is present in an amount of about 0.1% to 15%, the halogen bleach is present in an amount of about 0.1 to 15%, and the abrasive is present in an amount of about 1 to 55%, all based on the weight of the cleanser.

19. The cleanser of claim 13 wherein
the multivalent metal salt of a $C_{16-22}$ fatty acid is magnesium or zinc distearate; aluminum mono-, di- or tri- stearate; aluminum palmitate; or mixtures thereof.

20. A method for cleaning a hard surface comprising:
contacting the hard surface having a stain thereon with a phase and viscosity stable hard surface abrasive scouring cleanser which comprises:
(a) a colloidal aluminum oxide thickener having average particle size in dispersion of no greater than about one micron;
(b) a least one surfactant which will associate with the aluminum oxide to provide a plastic flowable rheology;
(c) an electrolyte/buffer to promote the environment in which the aluminum oxide and surfactant associate to provide said plastic flowable rheology;
(d) a halogen bleach;
(e) a fatty acid soap;
(f) a calcium carbonate abrasive having average particle size of about 40 to 800 microns to provide scouring action; and
(g) a phase stabilizing amount of a multivalent metal salt of a $C_{16-22}$ fatty acid wherein the metal is aluminum, magnesium or zinc.

21. A method for preparing a phase and viscosity stable hard surface abrasive scouring cleanser comprising combining
(a) a colloidal aluminum oxide thickener having average particle size in dispersion of no greater than about one micron;
(b) at least one surfactant which will associate with the aluminum oxide, provide plastic flowable rheology;
(c) an electrolyte/buffer to promote the environment in which the aluminum oxide and surfactant can associate to provide said plastic flowable rheology;
(d) a halogen bleach;
(e) a fatty acid soap;
(f) a calcium carbonate abrasive having average particle size of about 40 to 800 microns to provide scouring action; and
(g) a phase stabilizing amount of a multivalent metal salt of a $C_{16-22}$ fatty acid wherein the metal is aluminum, magnesium or zinc.

* * * * *